(12) United States Patent
Jang

(10) Patent No.: US 10,305,104 B2
(45) Date of Patent: May 28, 2019

(54) LI-ION BATTERY CATHODE MATERIALS WITH OVER-DISCHARGE PROTECTION

(75) Inventor: Young-Il Jang, Needham, MA (US)

(73) Assignee: A123 Systems, LLC, Waltham, MA (US)

( * ) Notice: Subject to any disclaimer, the term of this patent is extended or adjusted under 35 U.S.C. 154(b) by 1490 days.

(21) Appl. No.: 13/079,683

(22) Filed: Apr. 4, 2011

(65) Prior Publication Data

US 2011/0244324 A1    Oct. 6, 2011

Related U.S. Application Data

(60) Provisional application No. 61/320,499, filed on Apr. 2, 2010.

(51) Int. Cl.
| | |
|---|---|
| *H01M 4/52* | (2010.01) |
| *H01M 4/64* | (2006.01) |
| *H01M 4/66* | (2006.01) |
| *H01M 10/04* | (2006.01) |
| *H01M 4/02* | (2006.01) |
| *H01M 4/525* | (2010.01) |
| *H01M 4/131* | (2010.01) |
| *H01M 4/36* | (2006.01) |
| *H01M 4/505* | (2010.01) |
| *H01M 10/052* | (2010.01) |

(52) U.S. Cl.
CPC ........... *H01M 4/525* (2013.01); *H01M 4/131* (2013.01); *H01M 4/362* (2013.01); *H01M 4/505* (2013.01); *H01M 4/661* (2013.01); *H01M 10/052* (2013.01); *Y10T 29/49108* (2015.01)

(58) Field of Classification Search
CPC .... H01M 10/052; H01M 4/131; H01M 4/362; H01M 4/505; H01M 4/525; H01M 4/661
See application file for complete search history.

(56) References Cited

U.S. PATENT DOCUMENTS

| | | | |
|---|---|---|---|
| 5,053,297 A | 10/1991 | Yamahira et al. | |
| 5,278,000 A | 1/1994 | Huang et al. | |
| 5,744,264 A * | 4/1998 | Barker | 429/223 |
| 6,106,976 A * | 8/2000 | Ozaki | H01M 4/587 |
| | | | 429/218.1 |
| 6,720,113 B2 | 4/2004 | Goto et al. | |
| 7,282,300 B2 | 10/2007 | Goh et al. | |
| 2004/0053131 A1* | 3/2004 | Tanizaki et al. | 429/218.1 |
| 2006/0099508 A1* | 5/2006 | Thackeray et al. | 429/231.1 |
| 2006/0251967 A1 | 11/2006 | Goh | |
| 2007/0015055 A1 | 1/2007 | Lee et al. | |

(Continued)

*Primary Examiner* — Barbara L Gilliam
*Assistant Examiner* — Adam A Arciero
(74) *Attorney, Agent, or Firm* — McCoy Russell LLP

(57) ABSTRACT

A lithium-ion battery having over-discharge protection includes an anode comprising at least an electrochemically active anode material, said anode having an anode irreversible capacity loss during a first charge of the lithium-ion battery; and a cathode comprising at least an electrochemically active cathode material characterized by the formula:

$$x\mathrm{Li_2MnO_3}\cdot(1-x)\mathrm{LiMn}_a\mathrm{Ni}_b\mathrm{Co}_c\mathrm{O_2},$$

where $0<x<1$ and $a+b+c=1$, and x, a, b, and c are selected to provide a cathode irreversible capacity loss during a first charge of the lithium-ion battery that is greater than or equal to the anode irreversible capacity loss, and wherein the cathode possesses a voltage step less than about 2 V versus Li.

17 Claims, 2 Drawing Sheets

(56) References Cited

U.S. PATENT DOCUMENTS

2009/0123842 A1* 5/2009 Thackeray et al. .......... 429/224
2011/0052981 A1* 3/2011 Lopez ................ C01G 45/1257
                                                    429/206

* cited by examiner

LI-ION BATTERY CATHODE MATERIALS WITH OVER-DISCHARGE PROTECTION

RELATED APPLICATIONS

This application claims the benefit of priority under 35 USC § 119(e) to U.S. Application No. 61/320,499, filed on Apr. 2, 2010, which is hereby incorporated in its entirety by reference.

BACKGROUND OF THE INVENTION

The present invention relates to energy storage devices, and in particular, to using certain materials in the fabrication of the storage device components to mitigate detrimental effects of over-discharging the storage device.

During over-discharge of Li-ion (lithium-ion) batteries, the increase in potential at the negative electrode (anode) can cause cell failure or degradation by oxidizing and dissolving the current collector material. For example, many Li-ion batteries use a negative current collector made of copper. An oxidizing potential of greater than about 3.3 V vs. Li at the anode will cause dissolution, at least to some extent, of the copper current collector.

The following exemplary techniques may be used to mitigate the dissolution of the current collector:

(1) Adding $Li_2NiO_2$ to the cathode as over-discharge protection additive. With a low first cycle efficiency, $Li_2NiO_2$ reduces first cycle efficiency of the cathode to match with the first cycle efficiency of the anode.

(2) Adding to the cathode materials with a lithiation potential that is lower than 3.5V vs. Li (e.g., $LiFePO_4$, $LiMnO_2$).

The redox potentials of $Li_2NiO_2$ and $LiFePO_4$, however, are 3.6 V to 3.7 V and 3.45 V vs. Li, respectively, which are higher than the dissolution potential of copper. At zero voltage of a Li-ion battery (i.e., when the anode potential equals the cathode potential), copper dissolution may still occur, particularly at elevated temperature (e.g., at or above 60° C.).

SUMMARY OF THE INVENTION

In this invention, over-discharge protection is provided to the battery by a cathode that has irreversible capacity loss during first charge and exhibits a voltage plateau that lies below the oxidizing potential of the negative current collector. Specifically, the positive electrode material possesses a voltage step at, for example, 1.5V vs. Li, which is lower than the Cu dissolution potential.

As described herein, in general the cathode is a combination of one or more of (i) an electrochemically active materials, (ii) a binder, and (iii) an electrically conducting material. At least some of the disclosed embodiments concern the composition of the electrochemically active material in terms of constituent materials and additives, and how these materials and additives relate to various properties of the cathode.

In one aspect, the invention includes a method of protecting a lithium-ion battery from adverse effects related to over-discharge of the battery. The method includes providing an overdischarge-protecting material for inclusion in a cathode of the lithium-ion battery. The cathode including the overdischarge protecting material exhibits a predetermined amount of irreversible capacity loss during a first charge of the lithium-ion battery and possesses a voltage step below 2V versus lithium. The method further includes incorporating the cathode including the overdischarge protecting material into the lithium-ion battery.

In one embodiment, the overdischarge protecting material is characterized by the formula:

$$xLi_2MnO_3 \cdot (1-x)LiMn_aNi_bCo_cO_2, \text{ such that } 0<x<1 \text{ and } a+b+c=1.$$

Another embodiment further includes selecting a, b and c to provide the predetermined amount of irreversible capacity loss.

Another embodiment further includes disposing the cathode on a current collector.

In another embodiment, the cathode further includes one or more ingredients selected from the group consisting of $LiCoO_2$, $LiMn_2O_4$, $LiFePO_4$, $Li(Fe,Mn)PO_4$, $Li(Mn,Ni,Co)O_2$ and $Li(Ni,Co,Al)O_2$.

In one aspect, a lithium-ion battery having over-discharge protection, includes an anode comprising at least an electrochemically active anode material, said anode having an anode irreversible capacity loss during a first charge of the lithium-ion battery; and a cathode comprising at least an electrochemically active cathode material characterized by the formula:

$$xLi_2MnO_3 \cdot (1-x)LiMn_aNi_bCo_cO_2,$$

wherein $0<x<1$ and $a+b+c=1$, and x, a, b, and c are selected to provide a cathode irreversible capacity loss during a first charge of the lithium-ion battery that is greater than or equal to the anode irreversible capacity loss, and wherein the cathode possesses a voltage step less than about 2 V versus Li.

In one or more embodiments, the first lithiation capacity of the anode is greater than or equal to the first lithiation capacity of the cathode.

In one or more embodiments, x is in the range of about 0.4 to about 0.6.

In one or more embodiments, c is zero.

In one or more embodiments, the voltage plateau is between about 1V and about 2V versus lithium.

In one or more embodiments, the cathode comprises a layer of cathode electroactive material on a current collector.

In one or more embodiments, the anode comprises a layer of anode electroactive material on a current collector.

In one or more embodiments, the anode current collector comprises copper.

In one or more embodiments, the cathode further comprises an electrically conducting component.

In one or more embodiments, the anode electroactive material is selected from the group consisting of a carbon material and an alloy of silicon and/or tin and combinations thereof.

In one or more embodiments, the cathode further includes one or more electroactive materials selected from the group consisting of $LiCoO_2$, $LiMn_2O_4$, $LiFePO_4$, $Li(Fe,Mn)PO_4$, $Li(Mn,Ni,Co)O_2$ and $Li(Ni,Co,Al)O_2$, and olivine structure compound $LiMPO_4$, where M is one or more of V, Cr, Mn, Fe, Co, and Ni, in which the compound is optionally doped at the Li, M or O-sites.

In another aspect, a cathode for a lithium-ion battery includes an electrochemically active material; and a composition including the electrochemically active material, wherein the composition constitutes the cathode, and the cathode so constituted exhibits (i) a predetermined amount of irreversible capacity loss during a first charge of the lithium-ion battery and (ii) possess a voltage step below 2V versus lithium.

In another aspect, a method of making a lithium battery having over-discharge protection, includes providing and anode having a first lithiation capacity and a first irreversible capacity loss for an anode comprising at least an electrochemically active anode material; providing a cathode having a first lithiation capacity, a first irreversible capacity loss for a cathode comprising at least an electrochemically active cathode material, and a voltage plateau of greater than 2.0V versus Li, wherein the first cathode irreversible capacity loss is greater than or equal to the first irreversible capacity loss; and assembling the anode and cathode into a lithium battery.

In one or more embodiments, the cathode electroactive material comprises:

$$x\text{Li}_2\text{MnO}_3 \cdot (1-x)\text{LiMn}_a\text{Ni}_b\text{Co}_c\text{O}_2,$$

wherein $0<x<1$ and $a+b+c=1$, and x, a, b, and c are selected to provide a cathode irreversible capacity loss during a first charge of the lithium-ion battery that is greater than or equal to the anode irreversible capacity loss.

In one or more embodiments, the first lithiation capacity of the anode is greater than or equal to the first lithiation capacity of the cathode.

In one or more embodiments, the cathode comprises a layer of cathode electroactive material on a current collector.

In one or more embodiments, the anode comprises a layer of anode electroactive material on a current collector.

In one or more embodiments, the anode current collector comprises copper.

In one or more embodiments, the cathode further comprises an electrically conducting component.

In one or more embodiments, the anode electroactive material is selected from the group consisting of a carbon material and an alloy of silicon and/or tin and combinations thereof.

In one or more embodiments, the cathode further includes one or more electroactive materials selected from the group consisting of $\text{LiCoO}_2$, $\text{LiMn}_2\text{O}_4$, $\text{LiFePO}_4$, $\text{Li(Fe,Mn)PO}_4$, $\text{Li(Mn,Ni,Co)O}_2$ and $\text{Li(Ni,Co,Al)O}_2$, and olivine structure compound $\text{LiMPO}_4$, where M is one or more of V, Cr, Mn, Fe, Co, and Ni, in which the compound is optionally doped at the Li, M or O-sites.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
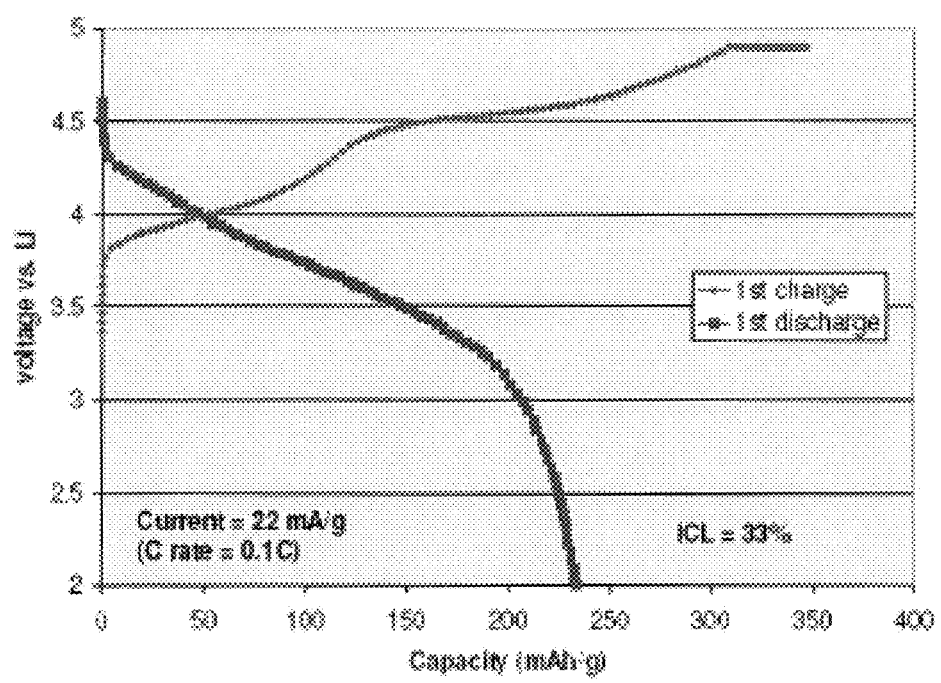
FIG. 1 illustrates a half cell capacity vs. discharge voltage relationship for a Li-ion battery with a cathode incorporating 0.41 $\text{Li}_2\text{MnO}_3$.0.59 $\text{LiNi}_{0.38}\text{Co}_{0.22}\text{Mn}_{0.40}\text{O}_2$.

The described embodiments provide a method and apparatus for preventing or mitigating adverse effects related to over-discharge of a Li-ion battery. The described embodiments utilize a cathode that at least partially includes an electrochemically active material described by:

$$x\text{Li}_2\text{MnO}_3 \cdot (1-x)\text{LiMn}_a\text{Ni}_b\text{Co}_c\text{O}_2, \text{ such that } 0<x<1 \text{ and } a+b+c=1.$$

The cathode materials are based on a composite matrix using a lithium-metal oxide that is integrated with a highly active form of another lithium-metal oxide component. The compound formula describes a family of lithiated mixed metal oxide layered composite cathode, and is referred to as lithium-rich nickel-manganese-cobalt (NMC) type cathode materials. The material can be a single phase composite material, for example, a nanocomposite material, having multiple domains made up of metal oxides of different composition.

In one embodiment, the electrochemically active material described above is combined with one or more other suitable electrochemically active materials to form the cathode. In variations of this embodiment, the cathode may have a layered structure, where for example the electrochemically active material forms a layer or coating on an electrically conducting material (e.g., aluminum). The electrochemically active material described above may be an additive to an existing cathode material. In another embodiment, the cathode material consists entirely of the electrochemically active material.

Suitable anode materials used in a Li-ion battery with cathodes as described herein may consist of an alloy of silicon (Si) and/or tin (Sn) or a material with a high graphite content. In one embodiment, the negative active material is a carbonaceous material. The carbonaceous material may be non-graphitic or graphitic. A small-particle-size, graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used.

Other embodiments include cathodes that include electroactive materials that are a mixture of $x\text{Li}_2\text{MnO}_3 \cdot (1-x)\text{LiMn}_a\text{Ni}_b\text{Co}_c\text{O}_2$ (where $0<x<1$, and $a+b+c=1$), along with other electrochemically active materials, including $\text{LiCoO}_2$, $\text{LiMn}_2\text{O}_4$, $\text{LiFePO}_4$, $\text{Li(Fe,Mn)PO}_4$, $\text{Li(Mn,Ni,Co)O}_2$, $\text{Li(Ni,Co,Al)O}_2$. Other exemplary electroactive materials include an olivine structure compound $\text{LiMPO}_4$, where M is one or more of V, Cr, Mn, Fe, Co, and Ni, in which the compound is optionally doped at the Li, M or O-sites. Deficiencies at the Li-site are compensated by the addition of a metal or metalloid, and deficiencies at the O-site are compensated by the addition of a halogen. In some embodiments, the positive active material is a thermally stable, transition-metal-doped lithium transition metal phosphate having the olivine structure and having the formula $(\text{Li}_{1-x}\text{Z}_x)\text{MPO}_4$, where M is one or more of V, Cr, Mn, Fe, Co, and Ni, and Z is a non-alkali metal dopant such as one or more of Ti, Zr, Nb, Al, or Mg, and x ranges from 0.005 to 0.05.

The cathode further includes an electrically conductive additive. Exemplary conductive additives include carbon black, acetylene black, vapor grown fiber carbon ("VGCF") and fullerenic carbon nanotubes. Conductive diluents are present in a range of about 1%-5% by weight of the total solid composition of the positive electrode.

The cathode is manufactured by applying a semi-liquid paste containing the cathode active compound and conductive additive homogeneously dispersed in a solution of a polymer binder in an appropriate casting solvent to a current collector foil or grid and drying the applied cathode composition. A metallic substrate such as aluminum foil or expanded metal grid is used as the current collector. The binder used in the electrode may be any suitable binder used as binders for non-aqueous electrolyte cells. Exemplary materials include a polyvinylidene fluoride (PVDF)-based polymers, such as poly(vinylidene fluoride) (PVDF) and its co- and terpolymers with hexafluoroethylene, tetrafluoroethylene, chlorotrifluoroethylene, poly(vinyl fluoride), polytetraethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

A Li-ion battery having a cathode that incorporates the electrochemically active material described above (i.e., $xLi_2MnO_3 \cdot (1-x)LiMn_aNi_bCo_cO_2$) exhibits a plateau in its capacity vs. discharge voltage relationship at approximately 1.5V vs. Li, however this plateau can be varied to between about 1.0V and about 2.0V depending on the components of the lithium battery. At zero voltage of Li-ion battery, the anode voltage matches the cathode voltage, so the potential of the anode described herein does not rise above the plateau voltage. The anode potential therefore remains below the dissolution potential of copper during an over-discharge condition, thereby preventing dissolution of the copper negative current collector and providing the described over-discharge protection.

FIG. 1 illustrates a half cell capacity vs. discharge voltage relationship for a Li half cell with a cathode incorporating an electroactive material having the formula:

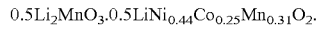
0.41 $Li_2MnO_3 \cdot 0.59$ $LiNi_{0.38}Co_{0.22}Mn_{0.40}O_2$. This figure demonstrates a high cathode irreversible capacity loss (ICL) due to irreversible oxygen loss from $Li_2MnO_3$ during the first charge greater than 4.4V. The high cathode ICL compensates the anode's ICL, providing over-discharge protection.

Figure 2:
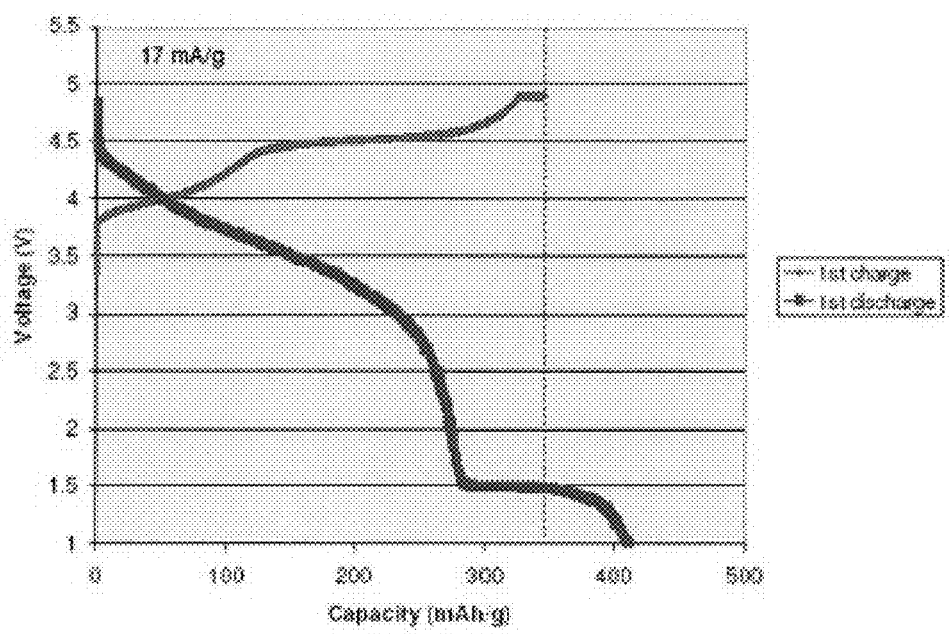
FIG. 2 illustrates a half cell capacity vs. discharge voltage relationship for a Li-ion battery with a cathode incorporating 0.5$\text{Li}_2\text{MnO}_3$.0.5$\text{LiNi}_{0.44}\text{Co}_{0.25}\text{Mn}_{0.31}\text{O}_2$.

FIG. 2 illustrates a half cell capacity vs. discharge voltage relationship for a Li half cell with a cathode incorporating an electroactive material having the formula:

$0.5Li_2MnO_3 \cdot 0.5LiNi_{0.44}Co_{0.25}Mn_{0.31}O_2$.

The plateau described above is shown beginning at approximately 280 mAh/g and extending beyond 350 mAh/g.

During the first charge above 4.4V vs. Li, the following reactions occur in $xLi_2MnO_3 \cdot (1-x)LiMO_2$ (M=Mn, Co, Ni).

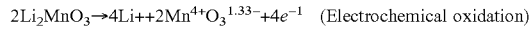
$2Li_2MnO_3 \rightarrow 4Li^+ + 2Mn^{4+}O_3{}^{1.33-} + 4e^{-1}$ (Electrochemical oxidation)

$2Mn^{4+}O_3{}^{1.33-} \rightarrow 2MnO_2 + O_2$ (Chemical redox reaction)

The net result of this two-step reaction is a loss of $Li_2O$ from the $Li_2MnO_3$ component. The release of oxygen can occur either as a gas or by reaction (oxidation) with the electrolyte solvent. The Li ions extracted from $Li_2MnO_3$ go to the anode, and can take part in subsequent cycling.

But not all of the Li ions extracted during the first charge can be reinserted into the $MO_2$ structure because of the irreversible removal of $Li_2O$ from $Li_2MnO_3$. This means, there is an extra supply of $Li^+$ from $Li_2MnO_3$, which is not used in subsequent cycling in normal voltage range (>2V vs. Li). Below 2V vs. Li, however, the extra $Li^+$ is used by forming $Li_2MO_2$-type compound. Therefore, Li-rich NMC is used for thermodynamic over-discharge protection. The value of the "x" parameter in $xLi_2MnO_3 \cdot (1-x)LiMO_2$ controls the amount of extra Li needed for (i) compensation of irreversible capacity loss in the anode and (ii) over-discharge protection. In addition, the selection of a, b and c affect the ICL. In some embodiments, the value of a, b and c can affect the value of the voltage plateau. In one or more embodiments, x is between about 0.4 and 0.6. In one or more embodiments, one of a, b and c is zero.

Thus, in one or more embodiment, the cathode electroactive material is selected to provide a cathode having a predetermined irreversible capacity loss that is greater than or equal to the anode irreversible cathode loss. The cathode is also selected to provide voltage plateau of less than 2V vs. Li, or between about 1V and about 2V vs. Li.

For an anode with first lithiation capacity of X mAh/g with Y % irreversible capacity loss with Z g/cm² active material loading, the first lithiation capacity of the anode is XZ mAh/cm² and the irreversible capacity loss in the anode is XYZ/100 mAh/cm². For $xLi_2MnO_3 \cdot (1-x)LiMO_2$ with first delithiation capacity U mAh/g with V % irreversible capacity loss (in normal voltage range >2V vs. Li) with W g/cm² active material loading, the first delithiation capacity of the cathode is UW mAh/cm² and the irreversible capacity loss in the cathode is UVW/100 mAh/cm². For $xLi_2MnO_3 \cdot (1-x)LiMn_aNi_bCo_cO_2$, V increases as x increases while it also depends on a, b, and c. U is determined by x, a, b, and c.

To prevent Li deposition during the formation, the first lithiation capacity of the anode needs to be greater than or equal to the first delithiation capacity of the cathode, that is XZ≥UW. To provide over-discharge protection, the irreversible capacity loss in the anode should be compensated by irreversible capacity loss in the cathode. To provide over-discharge protection, the irreversible capacity loss in the cathode must be greater than or equal to the irreversible capacity loss in the anode, which is UVW/100≥XYZ/100. The larger XZ−UW or UVW/100−XYZ/100, the smaller the cell capacity is for a given cell. Therefore, optimal differences have to be selected depending on cell design and manufacturing considerations.

For example, for a graphite anode with first lithiation capacity of 350 mAh/g with 10% irreversible capacity loss, $0.5Li_2MnO_3 \cdot 0.5LiNi_{0.44}Co_{0.25}Mn_{0.31}O_2$ with first delithiation capacity of 350 mAh/g with irreversible capacity loss of 23% (at voltage >2V vs. Li) with the Z/W ratio of 1.1 satisfies both of the conditions: XZ≥UW and UVW/100≥XYZ/100. Therefore, $0.5Li_2MnO_3 \cdot 0.5LiNi_{0.44}Co_{0.25}Mn_{0.31}O_2$ will function as over-discharge protected cathode.

For $xLi_2MnO_3 \cdot (1-x)LiMO_2$ with first delithiation capacity U mAh/g with V % irreversible capacity loss (in normal voltage range >2V vs. Li) with W g/cm² active material loading mixed with another cathode active material with first delithiation capacity R mAh/g with S % irreversible capacity loss with T g/cm2 active material loading, the first delithiation capacity of the cathode is (UW+RT) mAh/cm² and the irreversible capacity loss in the cathode is (UVW+RST)/100 mAh/cm².

To prevent Li deposition during the formation, the first lithiation capacity of the anode needs to be greater than or equal to the first delithiation capacity of the cathode, that is XZ≥(UW+RT). To provide over-discharge protection, the irreversible capacity loss in the anode should be compensated by irreversible capacity loss in the cathode. To provide over-discharge protection, the irreversible capacity loss in the cathode must be greater than or equal to the irreversible capacity loss in the anode that is (UVW+RST)/100≥XYZ/100. The larger XZ−UW or (UVW+RST)/100−XYZ/100, the smaller the cell capacity is for a given cell. Therefore, optimal differences have to be selected depending on cell design and manufacturing considerations.

For example, consider a graphite anode with first lithiation capacity of 350 mAh/g with 10% irreversible capacity loss and 22 mg/cm² active material loading, and cathode with $0.5$ $Li_2MnO_3 \cdot 0.5LiNi_{0.44}Co_{0.25}Mn_{0.31}O_2$ having first delithiation capacity of 350 mAh/g and irreversible capacity loss of 23% (at voltage >2V vs. Li) mixed $LiFePO_4$ with first delithiation capacity of 150 mAh/g with 0% irreversible capacity loss with active loading of 10 mg Li-rich NMC and 23.4 mg LiFePO$_4$ per cm$^2$. In this case, both of the conditions XZ≥(UW+RT) and (UVW+RST)/100≥XYZ/100 are satisfied. Therefore, 0.5Li$_2$MnO$_3$.0.5LiNi$_{0.44}$Co$_{0.25}$Mn$_{0.31}$O$_2$ will function as over-discharge protection additive to the cathode.

The cathode material suitable for use in the lithium battery can be prepared from a variety of cathode active materials, provided that it can provide the irreversible capacity loss and voltage plateau that provide over-discharge protection. In one or more embodiments, the cathode material has a general formula xLiMO$_2$.(1−x)Li$_2$M'O$_3$ in which 0<x<1, and where M is three or more ions including Mn, Co, and Ni with an average oxidation state of three and in which the Mn:Ni ratio is 1:1 or the Mn:Co ratio is 1:1 and M' is one or more ions having an average oxidation state of four with both the LiMO2 and Li2M'O3 components being layered and the ratio of Li to M and M' being greater than one and less than two. In one or more embodiments, the cathode material has a general formula xLi$_2$MnO$_3$.(1−x)LiMn$_{2-y}$M$_y$O$_4$ for 0.5<x<1.0 and 0≤y<1 in which the Li2MnO$_3$ and LiMn$_{2-y}$O$_4$ components have layered and spinel-type structures, respectively, corresponding to 0.8<x<1.0, and more preferably corresponding to 0.9<x<1.0, and in which M is one or more metal cations, the M cations being selected from one or more monovalent, divalent, trivalent or tetravalent cations, preferably from Li$^+$, Mg$^{2+}$, Ni$^{2+}$, Ni$^+$, Co$^{2+}$, Co$^{3+}$, Al$^{3+}$, Ti$^{4+}$ and Zr$^{4+}$ ions. Further information is found in U.S. Pat. Nos. 7,468,223 and 7,790,308, which are incorporated by reference.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A lithium-ion battery having over-discharge protection, comprising:

an anode comprising copper and at least a Z amount of an electrochemically active anode material comprising graphite and a first lithiation capacity of 350 mAh/g, said anode having an anode irreversible capacity loss of 10% during a first charge of the lithium-ion battery and further comprising an anode current collector, the anode comprising a layer of anode electroactive material on a current collector to form the anode current collector; and a cathode comprising a W amount, which is less than the Z amount, of a first electrochemically active cathode material, and having a first delithiation capacity R, characterized by the formula:

$x$Li$_2$MnO$_3$.(1−$x$)LiMn$_a$Ni$_b$Co$_c$O$_2$, wherein 0<x<1 and a+b+c=1, and x, a, b, and c are selected to provide a cathode irreversible capacity loss during the first charge of the lithium-ion battery that is greater than or equal to the anode irreversible capacity loss, and where the cathode further comprises a T amount, which is greater than the Z amount, of a second electrochemically active cathode material characterized by the formula:

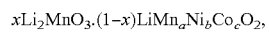
LiFePO$_4$, wherein the cathode possesses a voltage step less than 2 V versus Li, and wherein the cathode has a voltage plateau that lies below an oxidizing potential of the anode current collector and where the voltage plateau is between 1 V and 2 V versus Li between 280 and 350 mAh/g, and wherein XZ≥(UW+RT), wherein X is an anode first lithiation capacity per unit mass, U is a cathode first delithiation capacity per unit mass, and wherein XZ represents an anode first lithiation capacity per unit area, and UW+RT represents a cathode first delithiation capacity per unit area.

2. The battery of claim 1, wherein x is in a range of about 0.4 to about 0.6.

3. The battery of claim 1, wherein c is zero.

4. The battery of claim 1, wherein the cathode comprises one or more layers of first and second cathode electroactive materials on a current collector.

5. The battery of claim 1, wherein the cathode further includes carbon black, acetylene black, vapor grown fiber carbon, and fullerenic carbon nanotubes.

6. The battery of claim 1, wherein the anode current collector comprises copper.

7. The battery of claim 1, wherein the cathode further comprises an electrically conducting component.

8. The battery of claim 1, wherein the electrochemically active anode material is selected from the group consisting of a carbon material comprising one or more of spheroidal natural graphite, mesocarbon microbeads, and mesophase carbon fibers.

9. The battery of claim 1, wherein the second electrochemically active cathode material further includes one or more electroactive materials selected from the group consisting of LiCoO$_2$, LiMn$_2$O$_4$, LiFePO$_4$, Li(Mn)PO$_4$, Li(Mn,Ni,Co)O$_2$, and Li(Ni,Co,Al)O$_2$, and olivine structure compound LiMPO$_4$, where M is one or more of V, Cr, Mn, Co, and Ni, in which the compound is optionally doped at the Li, M, or O-sites.

10. A cathode and an anode for a lithium-ion battery, comprising:

Z g/cm$^2$ of an electrochemically active anode material including graphite, the anode further comprising a first lithiation capacity of X with Y % first irreversible capacity loss; and the cathode comprising W g/cm$^2$ of an electrochemically active cathode material, wherein W is less than Z, and where the cathode further comprises a first delithiation capacity of U with V % first irreversible capacity loss; wherein the lithium-ion battery comprising the cathode and the anode so constituted exhibits (i) a predetermined amount of irreversible capacity loss during a first charge of the lithium-ion battery and (ii) possesses a voltage step below 2 V versus lithium to prevent reaching an oxidizing potential of an anode current collector in an over-discharge condition, the anode current collector at least partially formed via a layer of the electrochemically active anode material on copper;

the electrochemically active cathode material is selected from the group consisting of 0.41 Li$_2$MnO$_3$ 0.59 LiNi$_{0.38}$Co$_{0.22}$Mn$_{0.40}$O$_2$ and 0.5 Li$_2$MnO$_3$ 0.5 LiNi$_{0.44}$CO$_{0.25}$Mn$_{0.31}$O$_2$; and a voltage plateau of the cathode lies below the oxidizing potential of the anode current collector and where the voltage plateau is between about 1 V and 2 V versus lithium.

11. A method of making a lithium battery having overdischarge protection, comprising:

providing an anode having a first lithiation capacity of X with Y % first irreversible capacity loss with Z g/cm² of an electrochemically active anode material comprising graphite and having an anode current collector comprising copper;

providing a cathode having a first delithiation capacity of U with V % first irreversible capacity loss with W g/cm² of a first electrochemically active cathode material, the cathode further comprising where the first electrochemically active cathode material is mixed with a second cathode active material with first delithiation capacity R with S % irreversible capacity loss with T g/cm² active material loading, and where XZ is greater than or equal to (UW+RT), and where (UVW+RST)/100 is greater than or equal to XYZ/100, and where W<Z<T, and a voltage plateau of less than 2.0 V versus Li, wherein the voltage plateau lies below an oxidizing potential of the negative current collector and where the voltage plateau is between about 1 V and 2 V versus Li, wherein the first cathode irreversible capacity loss is greater than or equal to the first anode irreversible capacity loss, wherein XZ≥UW, wherein XZ represents an anode first lithiation capacity per unit area and UW represents a cathode first delithiation capacity per unit area, and wherein the first electrochemically active cathode material comprises:

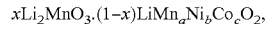
$xLi_2MnO_3 \cdot (1-x)LiMn_aNi_bCo_cO_2$, wherein $0<x<1$ and $a+b+c=1$, and x, a, b, and c are selected to provide the first cathode irreversible capacity loss during a first charge of the lithium battery that is greater than or equal to the first anode irreversible capacity loss, wherein U is determined by x, a, b, and c, wherein V increases as x increases, and wherein the second electrochemically active cathode material comprises:

$LiMPO_4$, where M is selected from V, Cr, Mn, Fe, Co, and Ni; and assembling the anode and cathode into the lithium battery.

12. The method of claim 11, wherein the cathode comprises one or more layers of the first and second electrochemically active cathode materials on a current collector.

13. The method of claim 12, wherein the anode comprises a layer of electrochemically active anode material on a current collector to form the anode current collector.

14. The method of claim 11, wherein the cathode further comprises conductive diluents present in a range of 1 to 5% by weight of a total solid composition of the cathode.

15. The method of claim 11, wherein the cathode further comprises an electrically conducting component.

16. The method of claim 11, wherein the electrochemically active anode material is selected from the group consisting of a carbon material and an alloy of silicon and/or tin and combinations thereof.

17. The method of claim 11, wherein the second electrochemically active cathode material comprises one or more electroactive materials selected from the group consisting of $LiCoO_2$, $LiMn_2O_4$, $LiFePO_4$, $Li(Fe,Mn)PO_4$, $Li(Mn,Ni,Co)O_2$, and $Li(Ni,Co,Al)O_2$, and olivine structure compound $LiMPO_4$, where M is one or more of V, Cr, Mn, Fe, Co, and Ni, in which the compound is optionally doped at the Li, M, or O-sites.

* * * * *